UNITED STATES PATENT OFFICE.

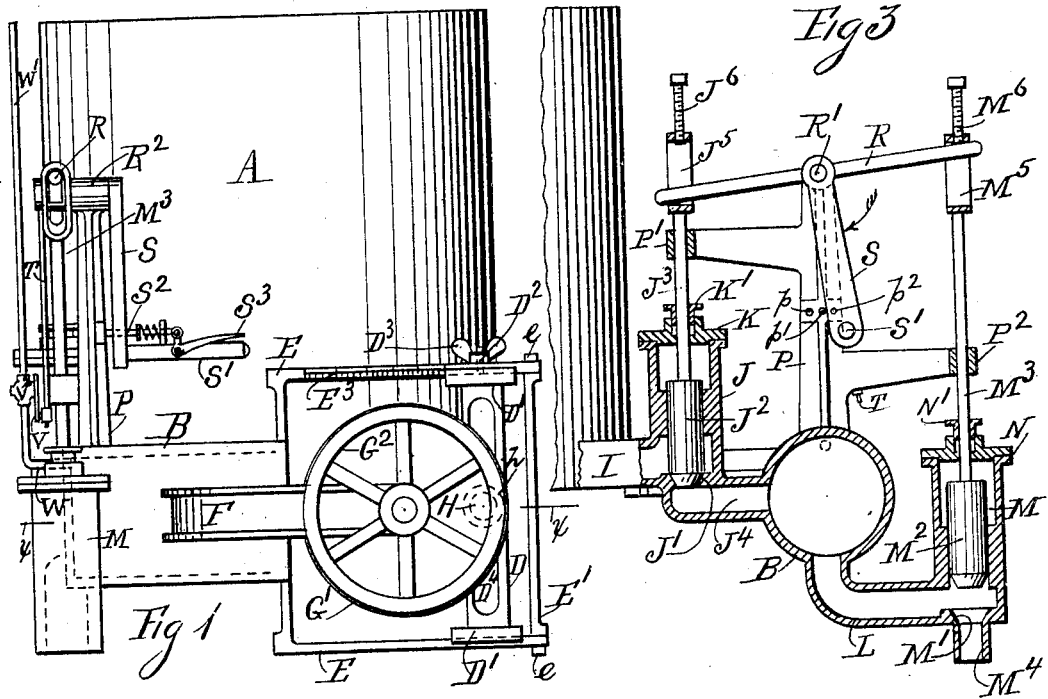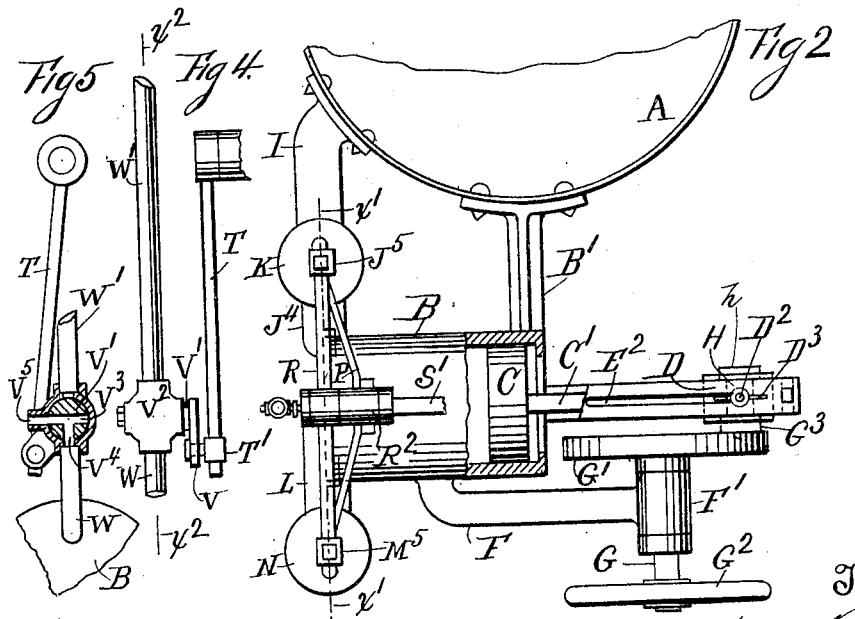

HENRY RAAB AND JACOB M. WOLFSON, OF NEW YORK, N. Y.

MEASURING DEVICE.

No. 810,082. Specification of Letters Patent. Patented Jan. 16, 1906.

Application filed August 21, 1905. Serial No. 275,077.

*To all whom it may concern:*

Be it known that we, HENRY RAAB and JACOB M. WOLFSON, citizens of the United States, and residents of the borough of Manhattan, city, county, and State of New York, have jointly invented a certain new and useful Measuring Device, of which the following is a specification.

This invention relates to a measuring device, and its organization comprises, essentially, a cylinder with a piston therein, means to move the piston to various positions, and a valve device to allow the filling and emptying of the cylinder.

The invention is exemplified in the accompanying drawings, in which—

Figure 1 represents a front elevation of the invention attached to a reservoir. Fig. 2 shows a partial plan view and section of Fig. 1 on the line $x\,x$. Fig. 3 is a partial end view and section of Fig. 2 on the line $x'\,x'$. Fig. 4 represents an enlarged fragmentary portion of Fig. 1. Fig. 5 shows a side view and partial section of Fig. 4 on the line $x^2\,x^2$.

To a reservoir A is fastened a cylinder B by means of the bracket B', and in which is located the piston C, with the piston-rod C' connected to the yoke D. The latter is supported in the guides E, that extend from the cylinder B and have connected therewith the column E' by means of the bolts $e$. The yoke D has formed at its top and bottom ends the slides D', that bear against the guides E, and the upper guide has an opening $E^2$, through which passes a bolt or stud $D^2$, that is carried by the yoke D and has a wing-nut $D^3$. On one of the faces of one of the guides E is marked a scale $E^3$, constituting with the upper slide an indicator for the position of the piston.

A bracket F extends from the cylinder B and has formed therewith the journal-bearing F', that carries the shaft G, with the crank-wheel G' and hand-wheel $G^2$. From the boss $G^3$ of the crank-wheel G' extends the crank-pin H with the collar $h$, the said crank-pin passing through the opening $D^4$ of the yoke, so that the end faces of the collar $h$ and boss $G^3$ straddle the said yoke.

To the reservoir A is clamped the cylinder-inlet conduit I, which leads to the inlet-valve chamber J. The said chamber has formed at its lower end the valve-seat J' for the inlet-valve $J^2$ with the spindle $J^3$. A bonnet K fits the said inlet-valve chamber J and has formed therein a stuffing-box with the gland K'. Below the port formed by the valve-seat J' is the conduit $J^4$, leading into the cylinder B at one end thereof. From the lower side and at one end of the cylinder the outlet-conduit L connects with the outlet-valve chamber M, similar in construction to the chamber J. It has formed therein the valve-seat M' for the outlet-valve $M^2$ with the spindle $M^3$. A bonnet N fits the said chamber M and has formed therein a stuffing-box with the gland N'. Below the port formed by the valve-seat M' is the outlet-conduit $M^4$.

A bracket P extends on the top of the cylinder B and has extending therefrom arms with the guides P' $P^2$ for the spindles $J^3$ and $M^3$, respectively. The spindle $J^3$ carries at its top end the loop $J^5$ and the spindle $M^3$ the loop $M^5$. In the loop $J^5$ is threaded the screw $J^6$ and the loop $M^5$ carries the screw $M^6$, the said screws being at times made relatively larger than shown in the drawings. The said loops are engaged by the ends of the beam R, that is secured to the shaft R', supported in the journal-bearing $R^2$, extending from the bracket P. Fastened to the shaft R' are the arms S and T. The ends of the screws $J^6$ and $M^6$ can be made to bear against the ends of the arm R by properly locating them in the loops $J^5$ and $M^5$, respectively. The arm S has connected therewith the handle S', on which is carried a spring-latch with the plunger $S^2$ and hand-lever $S^3$. Openings $p\,p'\,p^2$ are formed in the bracket P to allow the clamping of the arm S in different angular positions by the engagement of the plunger $S^2$ with one of the said openings $p\,p'\,p^2$. The arm T engages a sleeve T', that is journaled in the end of the arm V, which is connected with the plug V' of the vent-valve $V^2$. The plug V' has the through-port $V^3$ and the cross-port $V^4$ at right angles thereto. The valve is supported on the pipe W, leading from the cylinder B, and carries the vent and measuring pipe W', generally made of glass, and a secondary outlet for the valve is shown at $V^5$.

The valves in the valve-chamber are generally piston-valves, as shown, although other forms of valves may be used.

To use the invention, a fluid or other material which is to be measured is placed into the reservoir A. When the arm S is in the position shown particularly in Fig. 3, the valve $J^2$ is on its seat and prevents any of the fluid or material leaving the reservoir A and entering the cylinder B. When a fluid, &c., is to be taken out of the reservoir and measured, the arm S is moved to the left, as shown by the arrow in Fig. 3, by disengaging the plunger S² from the opening $p^2$ and engaging it with the opening $p$, which will raise the valve J² to allow the fluid, &c., to enter the cylinder B through the conduit J⁴ and seat the valve M² on its seat M to prevent the material leaving the cylinder before being measured. At the same time the lever T will be moved to open communication between the cylinder B and the atmosphere through the vent-pipe W'. The hand-wheel G² is then turned to bring the piston to the required position (indicated by the position of the slide D' on the scale E³) to fill it with a specified amount of material or fluid, and it can be clamped in position by the wing-nut D³. As the fluid or other material enters the cylinder the air escapes through the vent-pipe W', and when the cylinder has been filled it will be indicated in said pipe W'. As soon as the material shows above the vent-valve V² the arm S is moved back to the position shown in Fig. 3, which raises the valve M² from its seat M' and closes the valve J² with its seat J' and at the same time closes communication between the cylinder B and pipe W' and opens communication between the opening V⁵ and the inside of the said cylinder. This latter disposition of parts allows the emptying of the cylinder with a vent through the opening V⁵ and prevents the material escaping which may have risen in the pipe W'. It will be noted that when the cylinder B is being filled the vent V⁵ is closed, and the pipe W' besides acting as a vent is also an overflow-pipe. After the cylinder has been drained it is ready for a second operation, and if the same amount of material is to be taken from the reservoir the piston is not moved, otherwise it is moved and clamped in a new position. Should it be desired to drain the reservoir without measing the material, the arm S is locked in a vertical position and the screws J⁶ and M⁶ brought to bear in a position to raise both of the valves J² and M², the arms V and T being disconnected, so as to keep the through-port V³ in a position to allow a vent to the cylinder through the tube W'.

The invention may be modified by dispensing with the stuffing-boxes of the valve-chambers J and M and making appropriate guides for the valve-spindles J³ and M³. Openings may be made in the upper portions of the valve-chambers to allow the air to escape and avoid compression therein.

Having described our invention, we claim—

1. In a measuring device the combination of a cylinder, a piston therein, means to move the piston, means to indicate the position of the piston, an inlet-valve chamber and an outlet-valve chamber connected with the cylinder, a valve in each chamber, a valve-spindle extending from each valve, a loop connected to each valve-spindle, a beam journaled adjacent to the cylinder and having its ends extending through the loops of the valve-spindles, and means to move the said beam.

2. In a measuring device the combination of a cylinder, a piston therein, means to move the piston, means to indicate the position of the piston, an inlet-valve chamber and an outlet-valve chamber connected with the cylinder, a valve in each chamber, a valve-spindle extending from each valve, a loop connected to each valve-spindle, a beam journaled adjacent to the cylinder and having its ends extending through the loops of the valve-spindles, and means connected with each loop to bear against the said beam and raise the said valves.

3. In a measuring device the combination of a cylinder, a piston therein, means to move the piston, means to indicate the position of the piston, an inlet-valve chamber and an outlet-valve chamber connected with the cylinder, a valve in each chamber, a valve-spindle extending from each valve, a loop connected to each valve-spindle, a beam journaled adjacent to the cylinder and having its ends extending through the loops of the valve-spindles, a screw threaded through each loop, arranged to bear against the beam and thereby raise the valves.

4. In a measuring device the combination of a cylinder, a piston therein, means to move the piston to various positions, means to indicate the position of the piston, an inlet-valve chamber and an outlet-valve chamber connected with the cylinder, a valve in each chamber, a stem for each valve, and a loop extending from each stem, a bracket extending from the cylinder, a journal-bearing supported on the bracket, a shaft in the bearing, a beam supported on the shaft, the ends of the beam engaging the said loops, a vent-pipe extending from the cylinder, a vent-valve connected with the vent-pipe, an arm extending from the shaft to move the same, a second arm connected to the shaft, and a connection between the second arm and the vent-valve.

5. In a measuring device the combination of a cylinder, a piston therein, means to move the piston to various positions, means to indicate the position of the piston, an inlet-valve chamber and an outlet-valve chamber connected with the cylinder, a valve in each chamber, a stem for each valve, and a loop extending from each stem, a bracket extending from the cylinder, a journal-bearing supported on the bracket, a shaft in the bearing, a beam supported on the shaft, the ends of the beam engaging the said loops, a vent-pipe extending from the cylinder, a vent-valve connected with the vent-pipe, an arm extending from the shaft to move the same, means to lock the arm in different positions, a second arm connected to the shaft, and a connection between the second arm and the vent-valve.

6. The combination of a reservoir, a conduit extending therefrom, an inlet-valve chamber connected with the conduit, a conduit leading from the inlet-valve chamber, a cylinder connected with the latter conduit, a piston in the cylinder, means to move the piston to various positions, means to clamp the piston in place, an indicator adjacent to the piston to indicate its position, a conduit leading from the cylinder, an outlet-valve chamber connected with the latter conduit, a bracket extending from the cylinder, a shaft journaled on the bracket, a beam secured to the shaft, an arm fastened to the shaft, a handle on the arm, a spring-latch connected to the handle to clamp the arm in different positions, a second arm extending from the shaft, a vent-valve having a through-port and a cross-port connected with the cylinder, a connection between the second arm and the vent-valve, a valve in each valve-chamber, and a spindle for each valve arranged to engage with the beam.

Signed at New York, in the county of New York and State of New York, this 14th day of August, A. D. 1905.

HENRY RAAB.
JACOB M. WOLFSON.

Witnesses:
W. H. BOWIE.
A. J. LEW BOWIE.